(12) United States Patent
Riojas (10) Patent No.: US 12,454,297 B2
(45) Date of Patent: Oct. 28, 2025

(54) ENHANCED MECHANISM FOR HAND TRUCKS

(71) Applicant: Frank Guerrero Riojas, Saginaw, TX (US)

(72) Inventor: Frank Guerrero Riojas, Saginaw, TX (US)

( * ) Notice: Subject to any disclaimer, the term of this patent is extended or adjusted under 35 U.S.C. 154(b) by 235 days.

(21) Appl. No.: 17/877,394

(22) Filed: Jul. 29, 2022

(65) Prior Publication Data

US 2023/0032003 A1 Feb. 2, 2023

Related U.S. Application Data

(60) Provisional application No. 63/228,019, filed on Jul. 31, 2021.

(51) Int. Cl.
| | |
|---|---|
| *B62B 1/04* | (2006.01) |
| *B62B 1/06* | (2006.01) |
| *B62B 1/12* | (2006.01) |
| *B62B 1/14* | (2006.01) |
| *B62B 5/00* | (2006.01) |
| *B62B 1/00* | (2006.01) |

(52) U.S. Cl.
CPC ............... *B62B 1/04* (2013.01); *B62B 1/06* (2013.01); *B62B 1/12* (2013.01); *B62B 1/14* (2013.01); *B62B 1/008* (2013.01); *B62B 5/00* (2013.01); *B62B 2205/30* (2013.01)

(58) Field of Classification Search
CPC .... B62B 1/04; B62B 1/06; B62B 1/12; B62B 1/14; B62B 2205/30; B62B 2205/32; B62B 1/008; B62B 5/00

USPC ............... 280/47.27; 414/446, 490
See application file for complete search history.

(56) References Cited

U.S. PATENT DOCUMENTS

| | | | | | |
|---|---|---|---|---|---|
| 1,142,088 | A | * | 6/1915 | Greene | ............ B62B 1/14 414/373 |
| 1,574,501 | A | * | 2/1926 | O'Brien | ............ B65D 19/38 108/55.1 |
| 1,934,289 | A | * | 11/1933 | White | ............ B62B 1/12 280/47.28 |
| 2,338,645 | A | * | 1/1944 | James | ............ B62B 1/02 108/55.1 |
| 4,239,249 | A | * | 12/1980 | Sprague | ............ B62B 1/002 280/47.27 |

(Continued)

FOREIGN PATENT DOCUMENTS

DE 102008044674 A1 * 3/2010 ............... B62B 1/14

*Primary Examiner* — James Keenan
(74) *Attorney, Agent, or Firm* — Eversheds Sutherland (US) LLP (57) ABSTRACT

Devices, systems, and methods are provided for helping hand trucks lift heavy objects. A device for attaching to hand trucks and lifting objects may include a pallet portion for lifting weight, the pallet portion having a bottom portion facing the ground and a top portion, wherein weight is arranged on the top portion; an angle maintaining portion attached to the bottom portion, wherein when the angle maintaining portion is touching the ground, the pallet portion is positioned at an angle greater than zero relative to the ground; and one or more slots attached to the bottom portion, wherein the one or more slots are configured to attach to a hand truck nose blade by sliding the hand truck nose blade into the one or more slots.

16 Claims, 8 Drawing Sheets

(56) References Cited

U.S. PATENT DOCUMENTS

| | | | | |
|---|---|---|---|---|
| 5,415,109 | A * | 5/1995 | McBride | B65D 19/0002 |
| | | | | 108/57.29 |
| 8,152,180 | B2 * | 4/2012 | Anspach | B62B 1/12 |
| | | | | 280/47.27 |
| 9,393,980 | B2 * | 7/2016 | Busser | B62B 1/12 |
| 10,137,920 | B1 * | 11/2018 | Bolden | B62B 1/008 |
| 2005/0161916 | A1 * | 7/2005 | Taylor | B62B 1/125 |
| | | | | 280/655.1 |

* cited by examiner

ENHANCED MECHANISM FOR HAND TRUCKS

CROSS-REFERENCE TO RELATED APPLICATION(S)

This application claims the benefit of U.S. Provisional Application No. 63/228,019, filed Jul. 31, 2021, the disclosure of which is incorporated by reference as if set forth in full.

TECHNICAL FIELD

This disclosure relates to methods, systems, and devices for helping hand trucks lift heavy objects.

BACKGROUND

Hand trucks commonly are used to lift and move heavy objects. The nose plate of a hand truck may include a blade (e.g., nose blade). However, when a heavy weight is on the blade, a hand truck often may require multiple people to lift and tilt.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for helping hand trucks lift heavy objects.

When a hand truck is in a resting position with its nose on the ground, a heavy weight on the nose may be difficult for a single person to lift so that the person may tilt the hand truck (e.g., lifting the nose and any weight on the nose) off of the ground to allow for rolling the hand truck. For example, hand trucks generally are L-shaped, with the nose plate parallel to the ground when in a resting position, and the frame perpendicular to the nose plate.

To tilt the hand truck and lift weight on the nose plate, a person has to lift and rotate the nose plate by tilting back the hand truck via the wheels of the hand truck. For example, a hand truck operator may lift the nose and its weight to an angle of about 30 degrees from the ground by pulling the frame toward the operator (e.g., backwards, relative to the orientation of the hand truck). With the weight of the nose off the ground, the hand truck may roll using its wheels to move the weight on the nose (e.g., as opposed to trying to wheel the hand truck with weight on the nose, when significant friction between the nose and the ground may occur).

However, with heavier weights on a hand truck nose, a single operator may be unable to safely tilt the hand truck to lift the weight on the nose. Often, an additional operator may be needed—one to pull back the frame, and another to help lift the weight on the nose and ensure that the weight does not fall off the nose.

There is therefore a need for an enhanced hand truck mechanism for lifting heavy weights.

In one or more embodiments, a hand truck "helper" may include a mechanism that may attach to and detach from a hand truck nose blade. For example, the hand truck helper may include a platform on which weight may be stored and transported. A hand truck nose blade may slide into the hand truck helper to attach to the hand truck helper. In this manner, when weight is loaded onto the hand truck helper, the hand truck helper and its weight may be loaded onto the nose blade of a hand truck by sliding the nose blade into the hand truck helper (e.g., similar to forming an attachable dolly). To make the weight easier to tilt (e.g., lift or put down) with the hand truck, the hand truck helper may include, on a side opposite of where the weight is placed (e.g., a side facing downward toward the ground) an angle maintaining portion that extends from the bottom of the hand truck helper. When the angle maintaining portion is touching the ground, the hand truck helper (e.g., and nose blade) may be at an angle off of the ground (e.g., 30 degrees) rather than the nose blade and hand truck helper being parallel to and on the ground. In this manner, the hand truck helper and nose blade may be positioned at an angle when the hand truck blade attaches to the hand truck helper, resulting in the weight on the hand truck helper and nose blade being at the same angle relative to the ground. As a result, the hand truck frame does not need to be pulled back from an angle perpendicular to the ground, making it easier for an operator to tilt the hand truck frame, lift the weight on the nose blade, and transport the weight by rolling the hand truck with its wheels.

In one or more embodiments, the angle maintaining portion may be welded to the bottom surface of the hand truck helper, in between two respective sides (e.g., at or near the middle of the bottom of the hand truck helper). As a result, when the hand truck helper is on the ground, its resting position will be tilted rather than parallel to the ground. For example, a first end of the hand truck helper and the angle maintaining portion may be touching the ground when in the resting position, but the rest of the bottom of the hand truck helper may be lifted off the ground at an angle due to the angle maintaining portion.

In one or more embodiments, the hand truck helper may include a pallet portion for supporting weight on the top surface of the pallet portion. Underneath the pallet portion (e.g., on a bottom surface facing the ground), the hand truck helper may include one or more slots into which a hand truck blade may slidably engage the hand truck helper. The hand truck nose blade may slide into the one or more slots so that the hand truck nose blade is at least partially underneath the hand truck helper. The one or more slots may prevent the hand truck nose blade from sliding out from underneath the sides of the hand truck helper (e.g., as the hand cart turns). The distance between the one or more slots and the angle maintaining portion may be sufficient to allow the entirety of a hand truck nose blade to slide underneath the pallet portion (e.g., the one or more slots may be arranged more proximal to a side of the hand truck helper than the angle maintaining portion, which may be arranged more proximal to an opposite side of the hand truck helper). In this manner, the nose blade may slide under the pallet portion to support the hand truck helper to support the weight of the hand truck helper when tilting the frame of the hand truck, and the angle maintaining portion will not prevent the insertion of the nose blade into the one or more slots.

In one or more embodiments, to maintain the balance of the hand truck helper when engaged by a hand truck and when supporting weight, the angle maintaining portion may be U-shaped to allow for more surface area of the angle maintaining portion to be in contact with the ground when in a resting position. In this manner, the hand truck and engaged hand truck helper may avoid tipping over when a heavy weight is on the hand truck helper and the engaged nose blade.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

Figure 1:
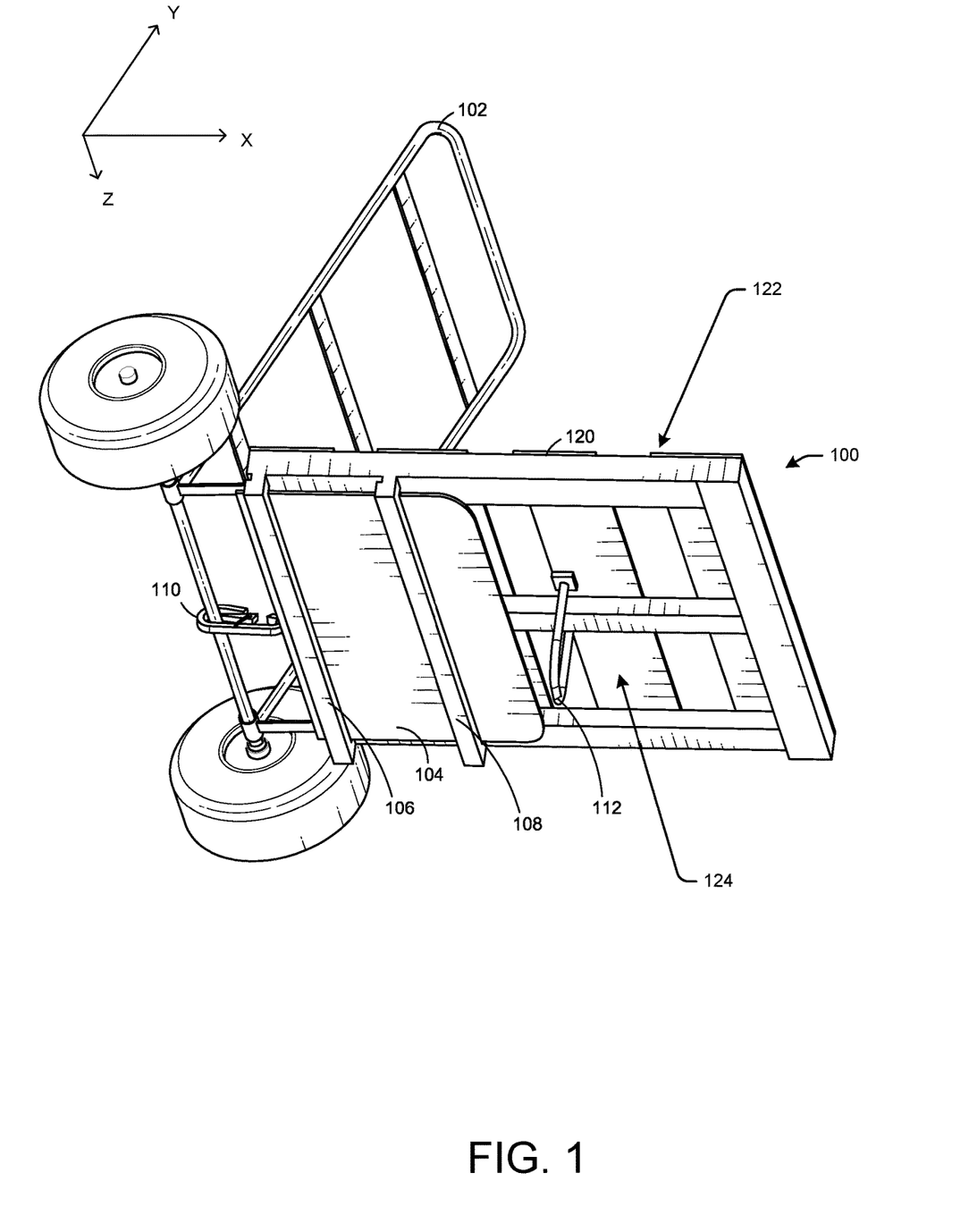
FIG. 1 illustrates an example bottom perspective view of a hand truck aid system, in accordance with one or more example embodiments of the present disclosure.

FIG. 1 illustrates an example bottom perspective view of a hand truck aid system, in accordance with one or more example embodiments of the present disclosure.

Figure 6:
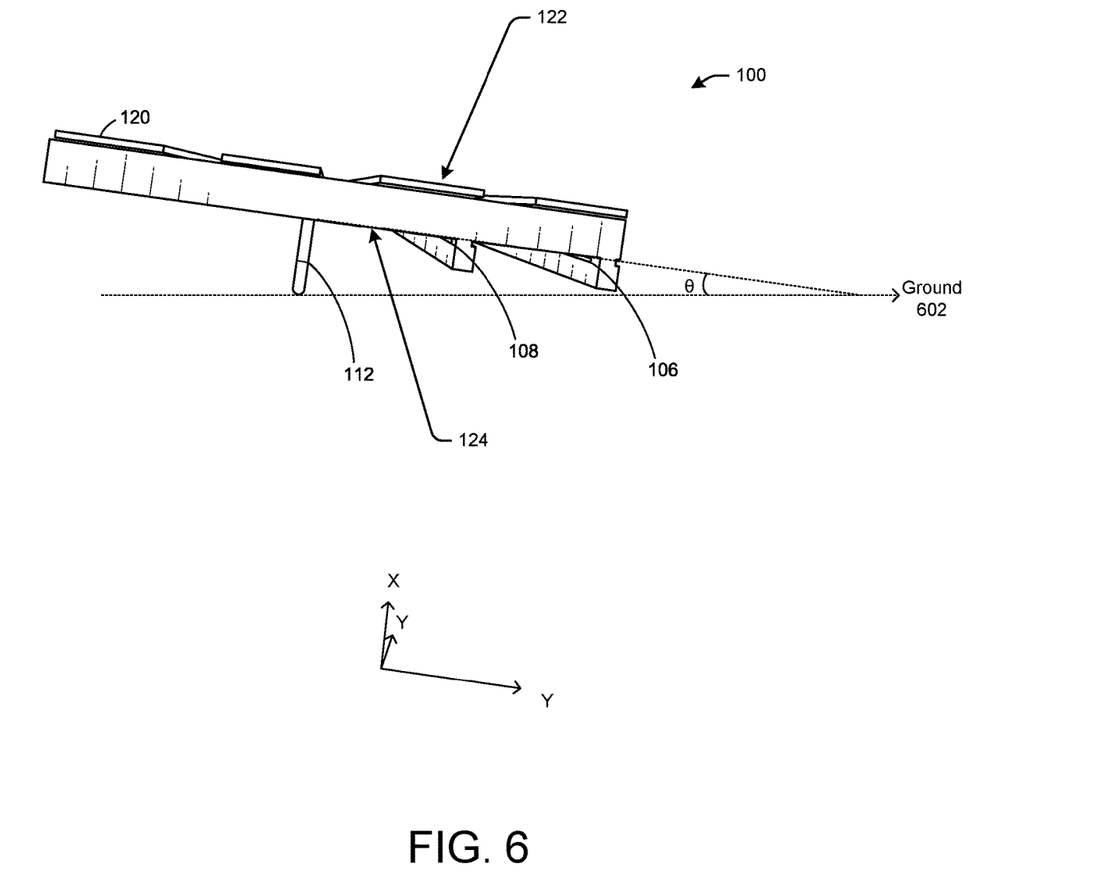
FIG. 6 illustrates a side perspective view of the hand truck aid of FIG. 1, in accordance with one or more example embodiments of the present disclosure.

Referring to FIG. 1, a hand truck aid (e.g., "helper) 100 (e.g., referred to herein as a device or system) may attach to a hand truck 102 by allowing a nose blade 104 of the hand truck 102 to slide into slots 106 and 108 of the hand truck aid 100. The hand truck aid 100 may include a clip 110 for securing the hand truck aid 100 to the hand truck 102. The hand truck aid 100 may include an angle maintaining portion 112 to maintain an angle of the hand truck aid 100 relative to the ground (e.g., as shown in FIG. 6) so that any weight placed on the hand truck aid 100 when engaged by the nose blade 104 of the hand truck 102 results in the hand truck 102 being easier to tilt and roll.

Still referring to FIG. 1, the hand truck aid 100 may include a pallet portion 120 having a top portion 122 and a bottom portion 124 (e.g., facing the ground). The top portion 122 may support the weight of items placed on the hand truck aid 100.

In one or more embodiments, the hand truck aid 100 may attach to and detach from the nose blade 104. For example, the nose blade 104 may slide into the hand truck aid 100 to attach to the hand truck aid 100. In this manner, when weight is loaded onto the hand truck aid 100, the hand truck aid 100 and its weight may be loaded onto the nose blade 104 of the hand truck 102 by sliding the nose blade 104 into the hand truck aid 100 (e.g., similar to forming an attachable dolly). To make the weight easier to tilt (e.g., lift or put down) with the hand truck 102, the hand truck aid 100 may include, on a side opposite of where the weight is placed (e.g., the bottom portion 124) the angle maintaining portion 112 that extends from the bottom portion 124 of the hand truck aid 100. When the angle maintaining portion 112 is touching the ground, the hand truck aid 100 (e.g., and the nose blade 104) may be at an angle off of the ground (e.g., as shown in FIG. 6) rather than the nose blade 104 and the hand truck aid 100 being parallel to and on the ground. In this manner, the hand truck aid 100 and the nose blade 104 may be positioned at an angle when the nose blade 104 attaches to the hand truck aid 100, resulting in the weight on the hand truck aid 100 and the nose blade 104 being at the same angle relative to the ground. As a result, the hand truck 102 does not need to be pulled back from an angle perpendicular to the ground, making it easier for an operator to tilt the hand truck 102, lift the weight on the nose blade 104, and transport the weight by rolling the hand truck 102 with its wheels.

Figure 8:
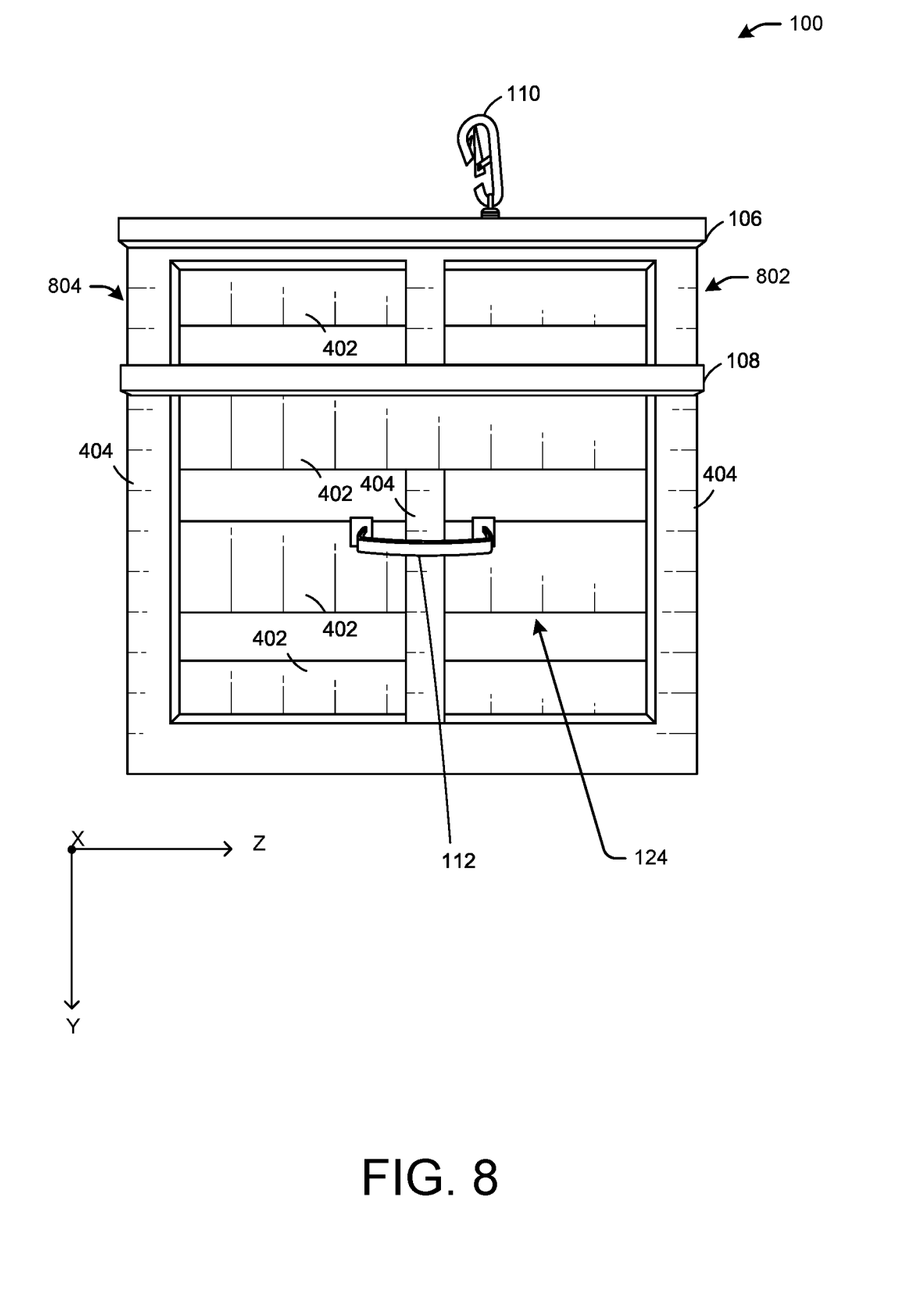
FIG. 8 illustrates a bottom view of the hand truck aid of FIG. 1, in accordance with one or more example embodiments of the present disclosure.

In one or more embodiments, the angle maintaining portion 112 may be welded to the bottom portion 124 of the hand truck aid 100, in between two respective sides (e.g., as described with respect to FIG. 8). As a result, when the hand truck aid 100 is on the ground, its resting position will be tilted rather than parallel to the ground.

In one or more embodiments, underneath the pallet portion 120 (e.g., on the bottom portion 124), the hand truck aid 100 may include the slots 106 and 108 into which a hand truck blade may slidably engage the hand truck aid 100 from underneath the top portion 122. The nose blade 104 may slide into the slots 106 and 108 so that the nose blade 104 is at least partially underneath the hand truck aid 100. The slots 106 and 108 may prevent the nose blade 104 from sliding out from underneath the sides of the hand truck aid 100 (e.g., as the hand truck 102 turns). The distance between the slots 106, the slots 108, and the angle maintaining portion 112 may be sufficient to allow the entirety of the nose blade 104 to slide underneath the pallet portion 120. In this manner, the nose blade 104 may slide under the pallet portion 120 to support the hand truck aid 100 when tilting the frame of the hand truck 102, and the angle maintaining portion 112 will not prevent the insertion of the nose blade 104 into the slots 106 and 108.

In one or more embodiments, to maintain the balance of the hand truck aid 100 when engaged by the hand truck 102 and when supporting weight, the angle maintaining portion 112 may be U-shaped to allow for more surface area of the angle maintaining portion 112 to be in contact with the ground when in a resting position. In this manner, the hand truck 102 and the hand truck aid 100, when engaged, may avoid tipping over when a heavy weight is on the hand truck aid 100 and the engaged nose blade 104.

In one or more embodiments, the hand truck aid 100 may be made of iron and/or aluminum.

Figure 2:
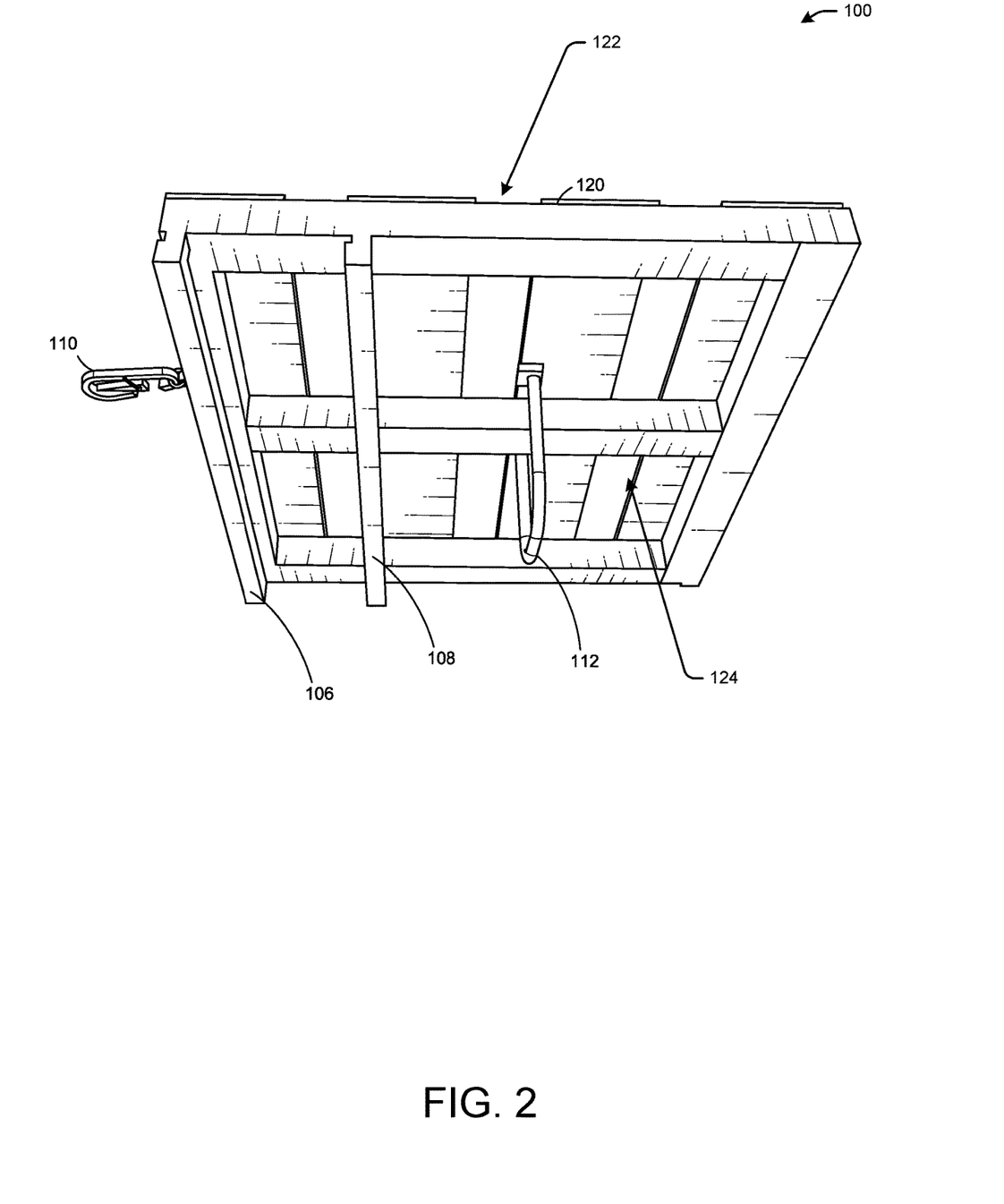
FIG. 2 illustrates a bottom perspective view of the hand truck aid of FIG. 1, in accordance with one or more example embodiments of the present disclosure.

FIG. 2 illustrates a bottom perspective view of the hand truck aid 100 of FIG. 1, in accordance with one or more example embodiments of the present disclosure.

Referring to FIG. 2, the hand truck aid 100 is shown detached from the hand truck 102 of FIG. 1. The clip 110 may disengage from the hand truck 102, and the nose blade 104 of FIG. 1 may slide out from the slots 106 and 108 to detach the hand truck aid 100 from the hand truck 102.

Figure 3:
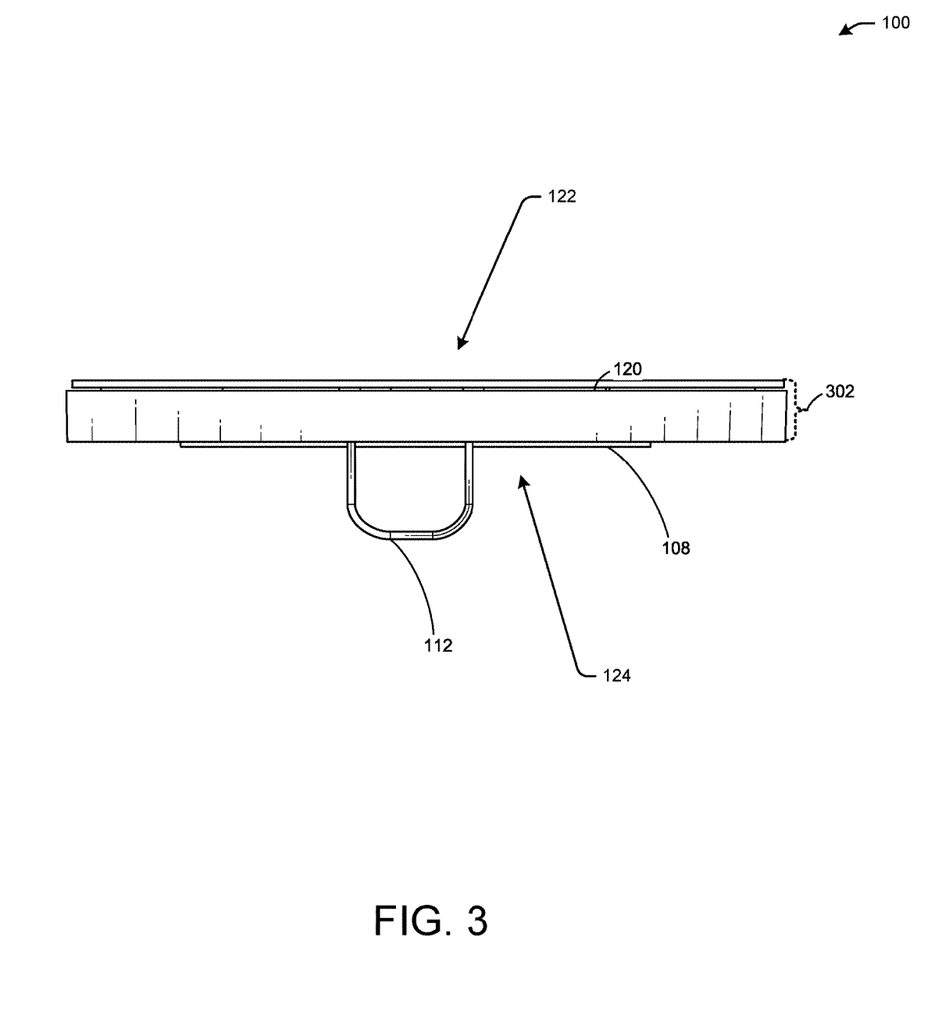
FIG. 3 illustrates a front view of the hand truck aid of FIG. 1, in accordance with one or more example embodiments of the present disclosure.

FIG. 3 illustrates a front view of the hand truck aid 100 of FIG. 1, in accordance with one or more example embodiments of the present disclosure.

Referring to FIG. 3, the front view of the hand truck aid 100 is opposite the side of the hand truck aid 100 having the clip 110, so the clip 110 is not showing in FIG. 3. The U-shape of the angle maintaining portion 112 is showing in FIG. 3. For example, if the angle maintaining portion 112 were too narrow (e.g., a vertical pole extending from the bottom portion 124 of the hand truck aid 100), the hand truck aid 100 may fall to the side when weight is placed on the top portion 122. In this manner, the U-shape of the angle maintaining portion 112 provides stability to the hand truck aid 100 (and to the hand truck 102 when engaged with the hand truck aid 100) in addition to maintaining a non-zero angle with respect to the ground. The slots 108 also are showing in FIG. 3, as they may be more proximal to the angle maintaining portion 112 than the slots 106 may be in comparison (e.g., as shown in FIG. 1).

Still referring to FIG. 3, a thickness 302 of the pallet portion 120 may be between 1-3 inches.

Figure 4:
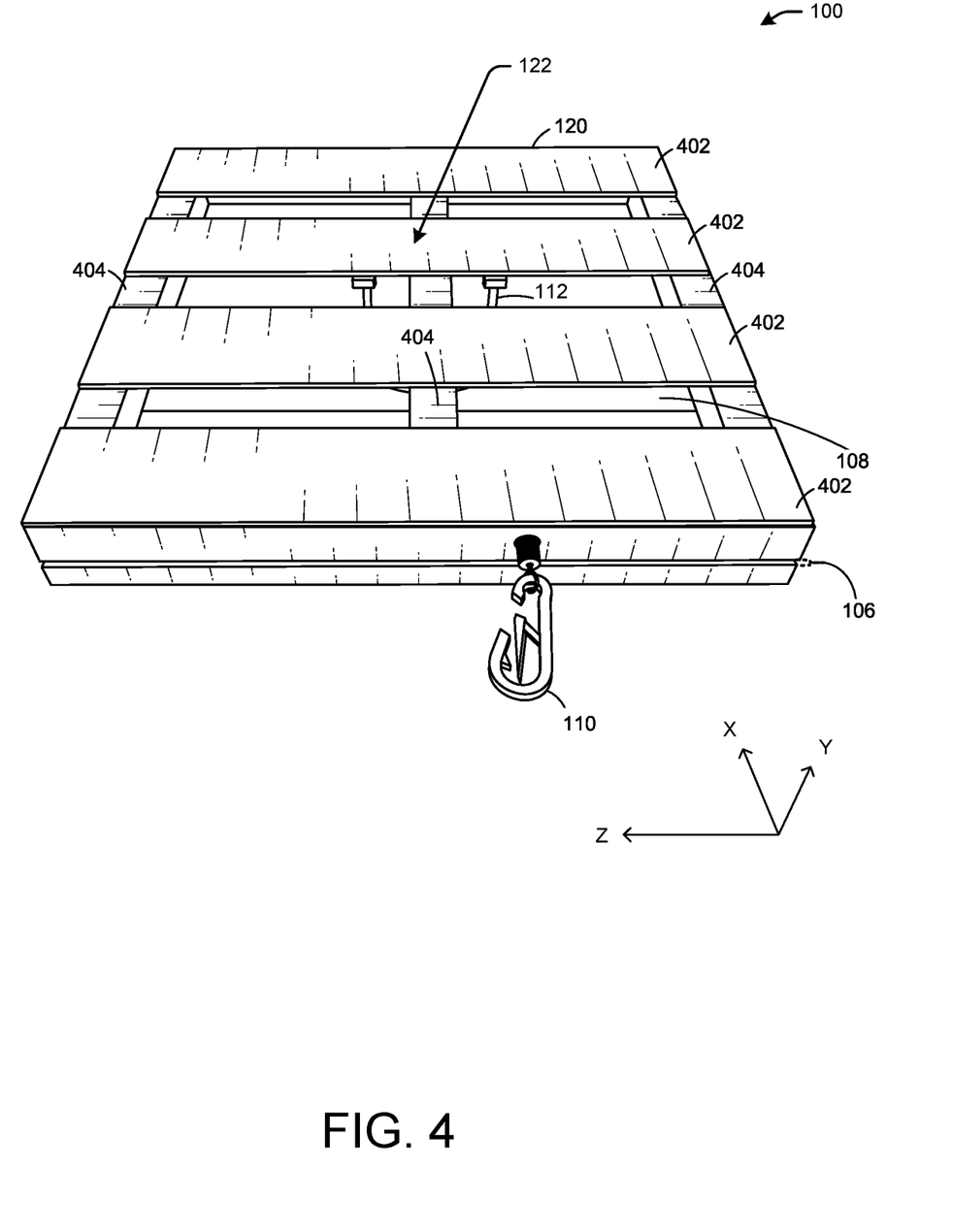
FIG. 4 illustrates a top perspective view of the hand truck aid of FIG. 1, in accordance with one or more example embodiments of the present disclosure.

FIG. 4 illustrates a top perspective view of the hand truck aid 100 of FIG. 1, in accordance with one or more example embodiments of the present disclosure.

Figure 5:
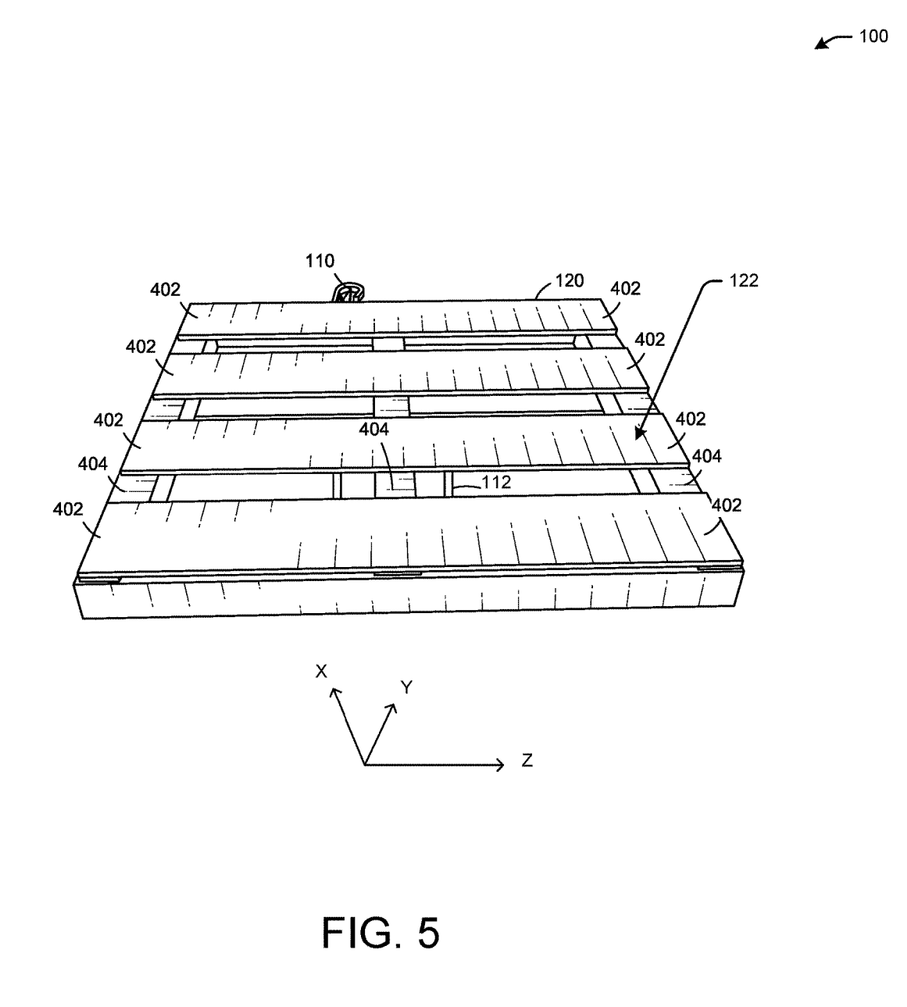
FIG. 5 illustrates a top perspective view of the hand truck aid of FIG. 1, in accordance with one or more example embodiments of the present disclosure.

FIG. 5 illustrates a top perspective view of the hand truck aid 100 of FIG. 1, in accordance with one or more example embodiments of the present disclosure.

Referring to FIGS. 4 and 5, the hand truck aid 100 is shown from the top, presenting the pallet portion 120. The pallet portion 120 may include multiple beams 402 extending laterally in one direction (e.g., along the Z-axis) and beams 404 extending laterally in another direction (e.g., along the X-axis) to form the pallet portion 120 and support weight placed on the top portion 122. The slots 106 and the slots 108 may extend laterally in the same direction as the beams 402, but underneath the beams 402 (e.g., relative to the Y-axis) so that the slots 106 and 108 are below the top portion 122.

FIG. 6 illustrates a side perspective view of the hand truck aid 100 of FIG. 1, in accordance with one or more example embodiments of the present disclosure.

Referring to FIG. 6, the angle θ at which the hand truck aid 100 may maintain the hand truck aid 100 (and the hand truck 102 of FIG. 1 when engaged with hand truck aid 100 via the nose blade 104) relative to the ground 602 is shown. Because the angle maintaining portion 112 may extend from the bottom portion of the hand truck aid 100 longer than the slots 106 and 108 extend (e.g., along the X-axis) from the bottom portion 124, the angle θ may be greater than zero. In this manner, when the hand truck 102 engages the hand truck aid 100 as shown in FIG. 1, the hand truck 102 may tilt at the angle θ, reducing the amount of force needed to tilt the hand truck 102 back to lift weight on the nose blade 104.

Figure 7:
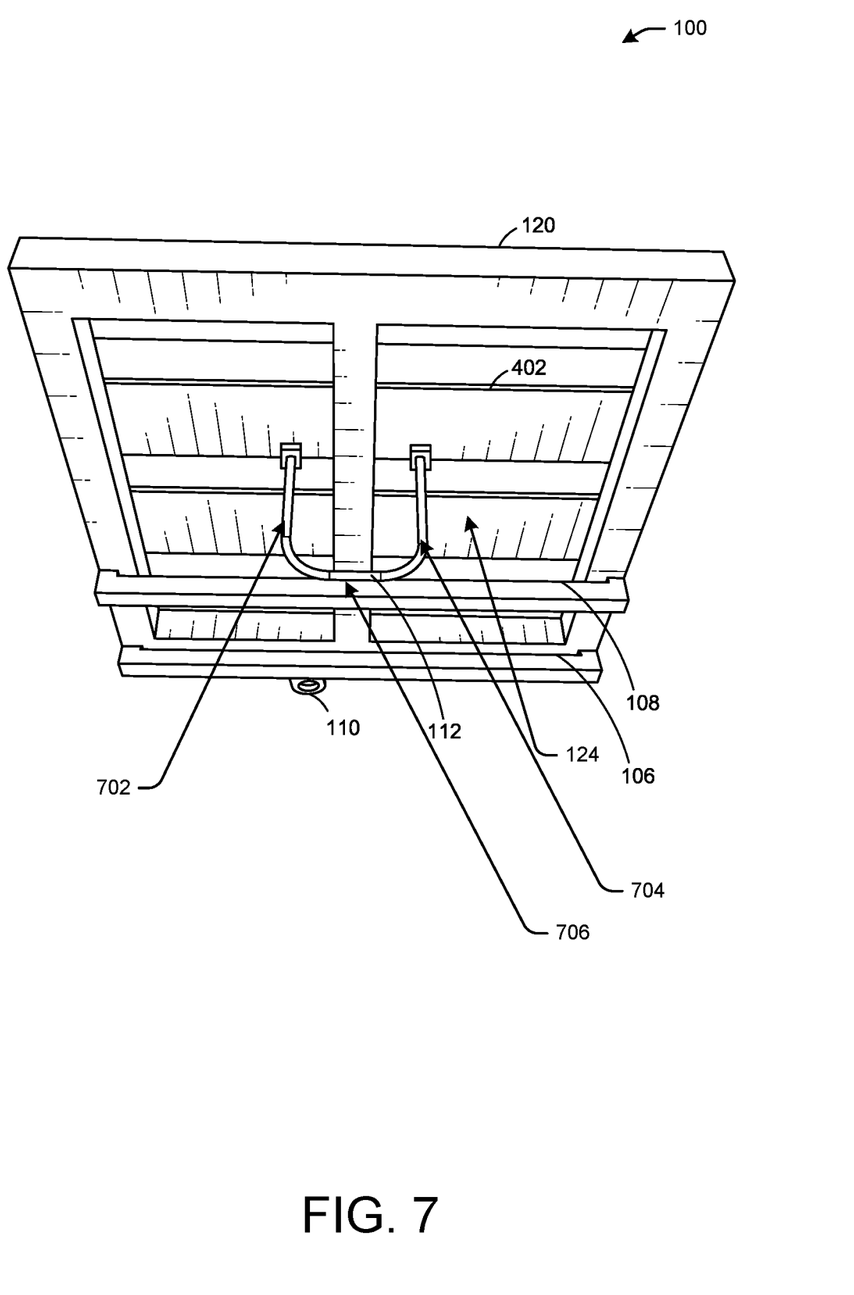
FIG. 7 illustrates a bottom perspective view of the hand truck aid of FIG. 1, in accordance with one or more example embodiments of the present disclosure.

FIG. 7 illustrates a bottom perspective view of the hand truck aid 100 of FIG. 1, in accordance with one or more example embodiments of the present disclosure.

Referring to FIG. 7, the U-shape of the angle maintaining portion 112 is shown, having two side portions 702 and 704, each attached (e.g., welded) to the bottom portion 124 (e.g., to one of the beams 402 of FIG. 4), and a bottom portion 706 parallel to the ground 602 of FIG. 6 to engage the ground 602.

FIG. 8 illustrates a bottom view of the hand truck aid 100 of FIG. 1, in accordance with one or more example embodiments of the present disclosure.

Referring to FIG. 8, the slots 106 and 108 are shown as extending from a first side 802 of the hand truck aid 100 (e.g., formed by one of the beams 404 of FIG. 4) to a second side 804 of the hand truck aid 100 (e.g., formed by another of the beams 404 of FIG. 4). The slots 106 and 108 may be below the beams 402 (e.g., along the X-axis going into the page, the slots 106 and 108 may be closer to the viewer of the page than the beams 402 are in comparison), forming a gap along the X-axis (e.g., as shown in FIGS. 4, 6, and 7) into which the nose blade 104 of FIG. 1 may slide into the slots 106 and 108.

The embodiments described herein are not meant to be limiting.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The processes described and shown above may be carried out or performed in any suitable order as desired in various implementations. Additionally, in certain implementations, at least a portion of the processes may be carried out in parallel, creating a co-existence use case. Furthermore, in certain implementations, less than or more than the processes described may be performed.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

The invention claimed is:

1. A device for attaching to hand trucks and lifting objects, the device comprising:
    a pallet portion for lifting weight, the pallet portion comprising a bottom portion facing the ground and a top portion, wherein weight is arranged on the top portion;
    an angle maintaining portion attached to the bottom portion more proximate to the center of the bottom portion than to any ends of the bottom portion, wherein when the angle maintaining portion is touching the ground, the pallet portion is positioned at an angle greater than zero relative to the ground and not parallel to the ground;
    first members attached to and extending downward toward the ground from opposite respective sides of the bottom portion; and a second member extending between the first members, wherein the first members, the second member, and the bottom portion form one or more slots configured to receive a hand truck nose blade by sliding the hand truck nose blade into the one or more slots, wherein the angle maintaining portion extends further from the bottom portion than the first members extend from the bottom portion, wherein the angle maintaining portion extending further from the bottom portion than the first members extend from the bottom portion positions the pallet portion at a non-parallel angle with respect to the ground and at which the angle maintaining portion and the second member prevent the bottom portion from contacting the ground.

2. The device of claim 1, wherein the one or more slots are formed proximal to a first side of the pallet portion, and wherein the angle maintaining portion is positioned in between the first side and a second side of the pallet portion.

3. The device of claim 2, wherein when the hand truck nose blade is slid into the one or more slots, the angle maintaining portion does not touch the hand truck nose blade.

4. The device of claim 1, wherein the one or more slots comprise a first slot proximal to a first side of the pallet portion, and a second slot in between the first slot and the angle maintaining portion.

5. The device of claim 1, wherein the angle maintaining portion is curved, with two portions connected to the bottom portion and a third portion, in between the two portions, configured to touch the ground.

6. The device of claim 1, wherein a thickness of the pallet portion is between one and three inches.

7. The device of claim 1, further comprising a clip device associated with securing the device to a hand truck.

8. A system for attaching to hand trucks and lifting objects, the system comprising:
    a hand truck;
    a pallet portion for lifting weight, the pallet portion comprising a bottom portion facing the ground and a top portion, wherein weight is arranged on the top portion;
    an angle maintaining portion attached to the bottom portion more proximate to the center of the bottom portion than to any ends of the bottom portion, wherein when the angle maintaining portion is touching the ground, the pallet portion is positioned at an angle greater than zero relative to the ground and not parallel to the ground; and
    first members attached to and extending downward toward the ground from opposite respective sides of the bottom portion; and
    a second member extending between the first members, wherein the first members, the second member, and the bottom portion form one or more slots configured to receive a nose blade of the hand truck by sliding the hand truck nose blade into the one or more slots,
    wherein the angle maintaining portion extends further from the bottom portion than the first members extend from the bottom portion,
    wherein the angle maintaining portion extending further from the bottom portion than the first members extend from the bottom portion positions the pallet portion at a non-parallel angle with respect to the ground and at which the angle maintaining portion and the second member prevent the bottom portion from contacting the ground.

9. The system of claim 8, wherein the one or more slots are formed proximal to a first side of the pallet portion, and wherein the angle maintaining portion is positioned in between the first side and a second side of the pallet portion.

10. The system of claim 9, wherein when the hand truck nose blade is slid into the one or more slots, the angle maintaining portion does not touch the hand truck nose blade.

11. The system of claim 8, wherein the one or more slots comprise a first slot proximal to a first side of the pallet portion, and a second slot in between the first slot and the angle maintaining portion.

12. The system of claim 8, wherein the angle maintaining portion is curved, with two portions connected to the bottom portion and a third portion, in between the two portions, configured to touch the ground.

13. The system of claim 8, wherein a thickness of the pallet portion is between one and three inches.

14. A hand truck aid device comprising:
    a pallet portion for lifting weight, the pallet portion comprising a bottom portion facing the ground and a top portion, wherein weight is arranged on the top portion;
    an angle maintaining portion attached to the bottom portion more proximate to the center of the bottom portion than to any ends of the bottom portion, wherein when the angle maintaining portion is touching the ground, the pallet portion is positioned at an angle greater than zero relative to the ground and not parallel to the ground;
    first members attached to and extending downward toward the ground from opposite respective sides of the bottom portion; and
    a second member extending between the first members, wherein the first members, the second member, and the bottom portion form one or more slots configured to receive a hand truck nose blade by sliding the hand truck nose blade into the one or more slots,
    wherein the angle maintaining portion extends further from the bottom portion than the first members extend from the bottom portion,
    wherein the angle maintaining portion extending further from the bottom portion than the first members extend from the bottom portion positions the pallet portion at a non-parallel angle with respect to the ground and at which the angle maintaining portion and the second member prevent the bottom portion from contacting the ground.

15. The hand truck aid device of claim 14, wherein the one or more slots are formed proximal to a first side of the pallet portion, and wherein the angle maintaining portion is positioned in between the first side and a second side of the pallet portion.

16. The hand truck aid device of claim 15, wherein when the hand truck nose blade is slid into the one or more slots, the angle maintaining portion does not touch the hand truck nose blade.

* * * * *